United States Patent
Dyer, II et al.

(10) Patent No.: US 7,163,258 B2
(45) Date of Patent: Jan. 16, 2007

(54) SLIDING CHASSIS SKIRT

(75) Inventors: Frederick W. Dyer, II, Fort Wayne, IN (US); Katrina R. Hunden, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/692,947

(22) Filed: Oct. 24, 2003

(65) Prior Publication Data

US 2005/0088013 A1  Apr. 28, 2005

(51) Int. Cl.
*B62D 35/00* (2006.01)
(52) U.S. Cl. ............... 296/191; 296/180.1; 296/180.2; 280/768; 280/849
(58) Field of Classification Search ............... 296/191, 296/180.1, 180.2, 181.5, 180.5; 280/163, 280/164.1, 768, 848, 154, 849; 180/89.12
See application file for complete search history.

(56) References Cited

U.S. PATENT DOCUMENTS

| | | | | |
|---|---|---|---|---|
| 4,991,906 A * | 2/1991 | Fingerle | .................. | 296/180.2 |
| 5,788,321 A * | 8/1998 | McHorse et al. | ......... | 296/180.1 |
| 5,947,520 A * | 9/1999 | McHorse | ..................... | 280/848 |
| 6,007,102 A * | 12/1999 | Helmus | ...................... | 280/849 |
| 6,086,139 A * | 7/2000 | Heim et al. | .............. | 296/146.5 |
| 6,260,911 B1 * | 7/2001 | Becker | .................... | 296/180.2 |
| 6,755,460 B1 * | 6/2004 | Marrs et al. | ........... | 296/187.12 |
| 6,899,374 B1 * | 5/2005 | Heard | ........................ | 296/155 |

\* cited by examiner

*Primary Examiner*—D. Glenn Dayoan
*Assistant Examiner*—Greg Blankenship
(74) *Attorney, Agent, or Firm*—Jeffrey P. Calfa; Dennis K. Sullivan; Susan L. Lukasik

(57) ABSTRACT

A motor vehicle chassis skirt panel provides for hiding components attached to the outside of the frame rails of a vehicle chassis in a first, closed position and allowing access when moved to a second open position. The chassis skirt panel is mounted below a truck body on at least one side of the vehicle and is set in a track allowing the panel to be moved back and forth.

10 Claims, 9 Drawing Sheets

SLIDING CHASSIS SKIRT

BACKGROUND OF THE INVENTION

1. Technical Field

The invention relates to truck body construction and more particularly to a sliding chassis skirt allowing quick and easy access to components hung from the chassis frame rails such as battery boxes.

2. Description of the Problem

Contemporary styling and good aerodynamic practice in truck design make use of chassis skirts which cover the lower portions of truck chassis. A disadvantage of this practice is that access to some components, particularly batteries, which are mounted on the frame rails or on supports depending from the frame rails of the vehicle chassis, is obstructed by the skirt. Inspection or repair of these components can require removal of the panels of the chassis skirt. This is both time consuming and may require the use of tools. Prior art skirt panels have been attached to a framework which depends from the vehicle chassis. As many as six to nine bolts, depending upon the configuration, may be used to attach the panel to the frame. Upon separation of the skirt panels from the vehicle they are subject to damage and possible installation error upon return to the vehicle.

SUMMARY OF THE INVENTION

It would be desirable to provide chassis skirts which do not hinder access to components supported from a vehicle's chassis which require periodic inspection or maintenance.

According to the invention a motor vehicle chassis skirt is provided along at least one side of a vehicle incorporating at least two panels including a first, forward fixed position panel and a second, aft moveable panel. A frame depends from a side of a motor vehicle chassis for supporting the second, aft moveable panel. The fixed position skirt panel is located in front of and in line with the second, aft moveable panel. The aft panel is supported on the frame below a motor vehicle body side for movement parallel to the direction of elongation of th motor vehicle chassis between a first, closed position and a second open position relative to the forward, fixed position skirt panel. Rearward movement of the second panel allows access to equipment depending from the chassis and located behind the panel when it is closed on the first, forward panel.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 10 is a cross sectional view of a roller used with the support system of FIG. 9.

DETAILED DESCRIPTION OF THE INVENTION

Figure 1:
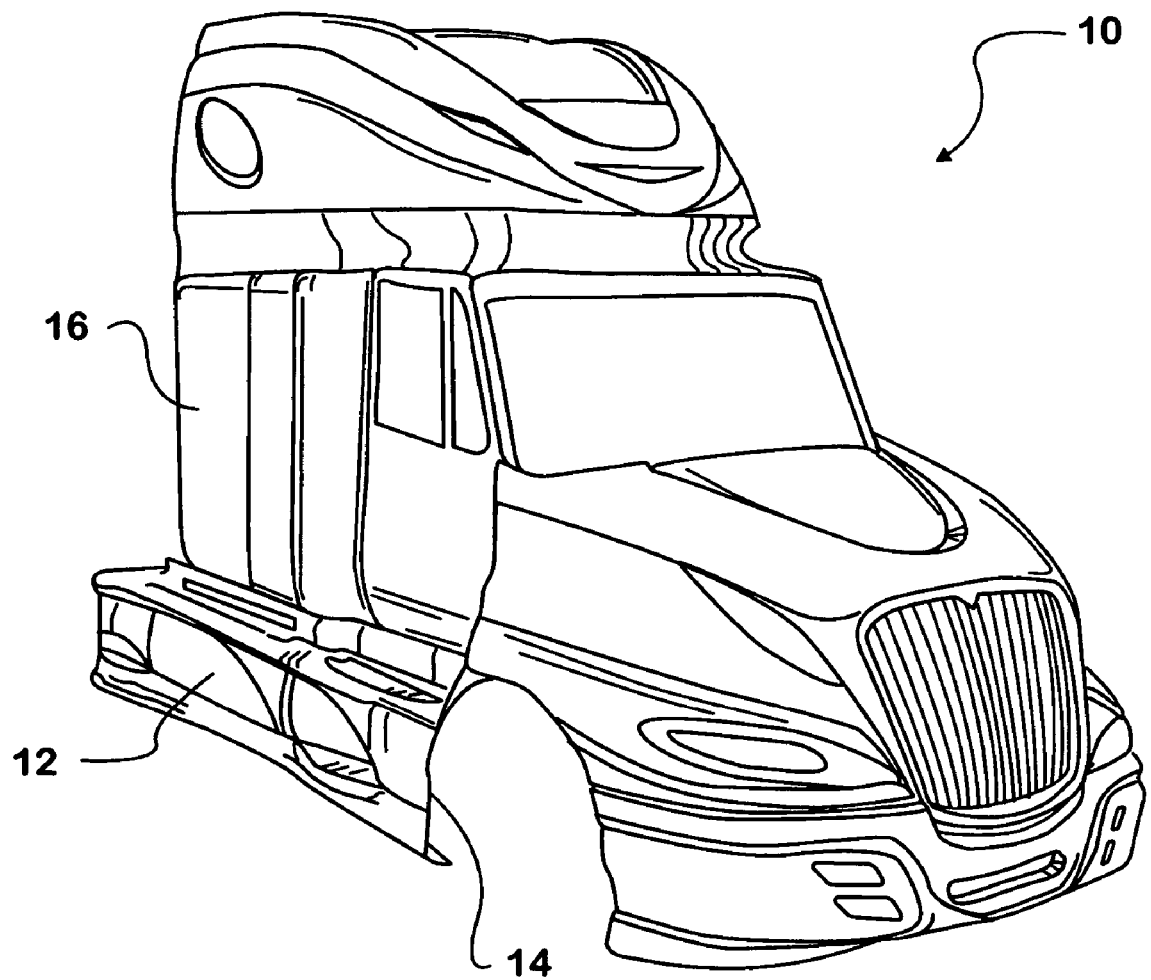
FIG. 1 is a perspective view of a truck body from the passenger side front quarter.

Referring to the drawings, and particularly to FIG. 1, a truck body 10 is illustrated with which the invention is advantageously employed. A lower body or chassis skirt 12 is disposed along passenger side 16 of body 10 behind a front wheel well 14. Chassis skirt 12 is primarily a stylistic tool used to promote a streamlined look and feel to trucks and to hide components hung from the outside of the vehicle chassis, but it provides some protection to those components and provides some reduction in the vehicle's aerodynamic drag coefficient.

Figure 2:
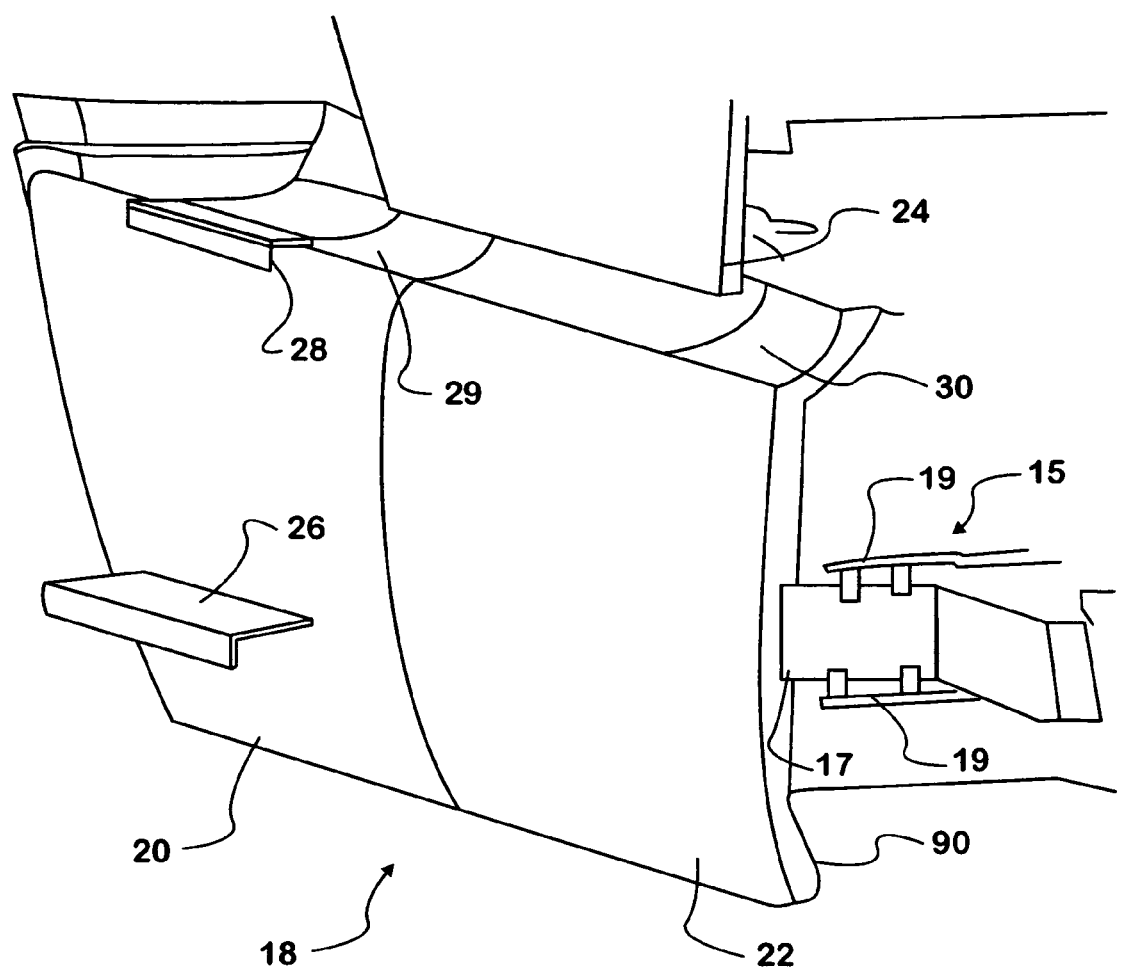
FIG. 2 is a perspective view of a vehicle driver side chassis skirt.

In FIG. 2 a two section chassis skirt 18 used on the driver side of truck body 10 is illustrated. Chassis skirt 18 includes a forward, fixed position skirt panel 20 and a rearward, movable skirt panel 22. Skirt panels 20 and 22 are aligned with one another and parallel to the sides of the vehicle in the direction of elongation of the vehicle and form, when skirt panel 22 is closed on panel 20, an apparently continuous chassis skirt 18. Skirt panels 20 and 22 include upper concave indented sections 29 and 30 which sweep upwardly, with the upper portion of section 30 fitting behind body modesty panel 24, relative to the outside of the vehicle. Body modesty panel 24 forms the lower part of truck body 10. The outer faces of the major parts of skirt panels 20 and 22 are generally in the same plane as, or bulge slightly outwardly from, the outer face of modesty panel 24. Steps 26 and 28 may be provided on or through the forward, fixed position skirt panel 20 to assist in access to a driver's side door. A latch mechanism 15 comprising a sliding plate 17 set in upper and lower tracks 19 is disposed adjacent a rear edge 90 of pan I 22. Plate 17 moves in or out alternately to hold skirt pan I 22 in place by rear edge 90 or to release the skirt panel for rearward movement. Latch mechanism 15 works with either of the disclosed embodiments.

Figure 3:
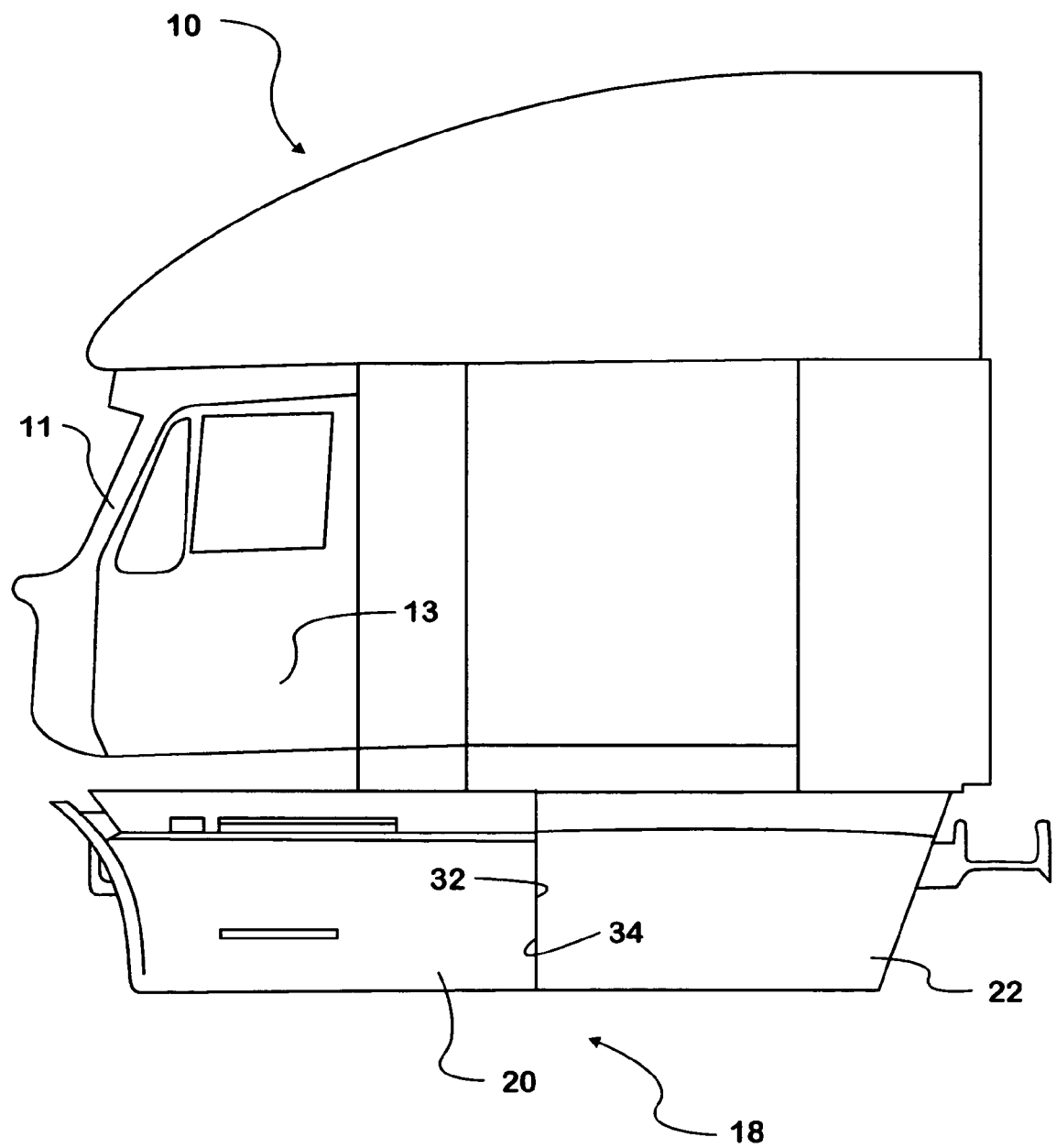
FIG. 3 is a side elevation of the driver side of a truck body with driver side chassis skirt with a moveable panel in its dosed state.

FIG. 3 illustrates chassis skirt 18 configured to substantially hide the portion of a vehicle chassis directly under a cab section 11 of a truck body 10 from view from the side. The forward section or skirt panel 20, located under driver door 13, has a fixed location. Skirt panel 20 may be mounted in conventional manner well known from the prior art. Rearward, movable skirt panel 22 is movable back and forth from a position where its forward vertical edge 32 in closely proximate to, if not in abutment with, a rearward vertical edge 34.

Figure 4:
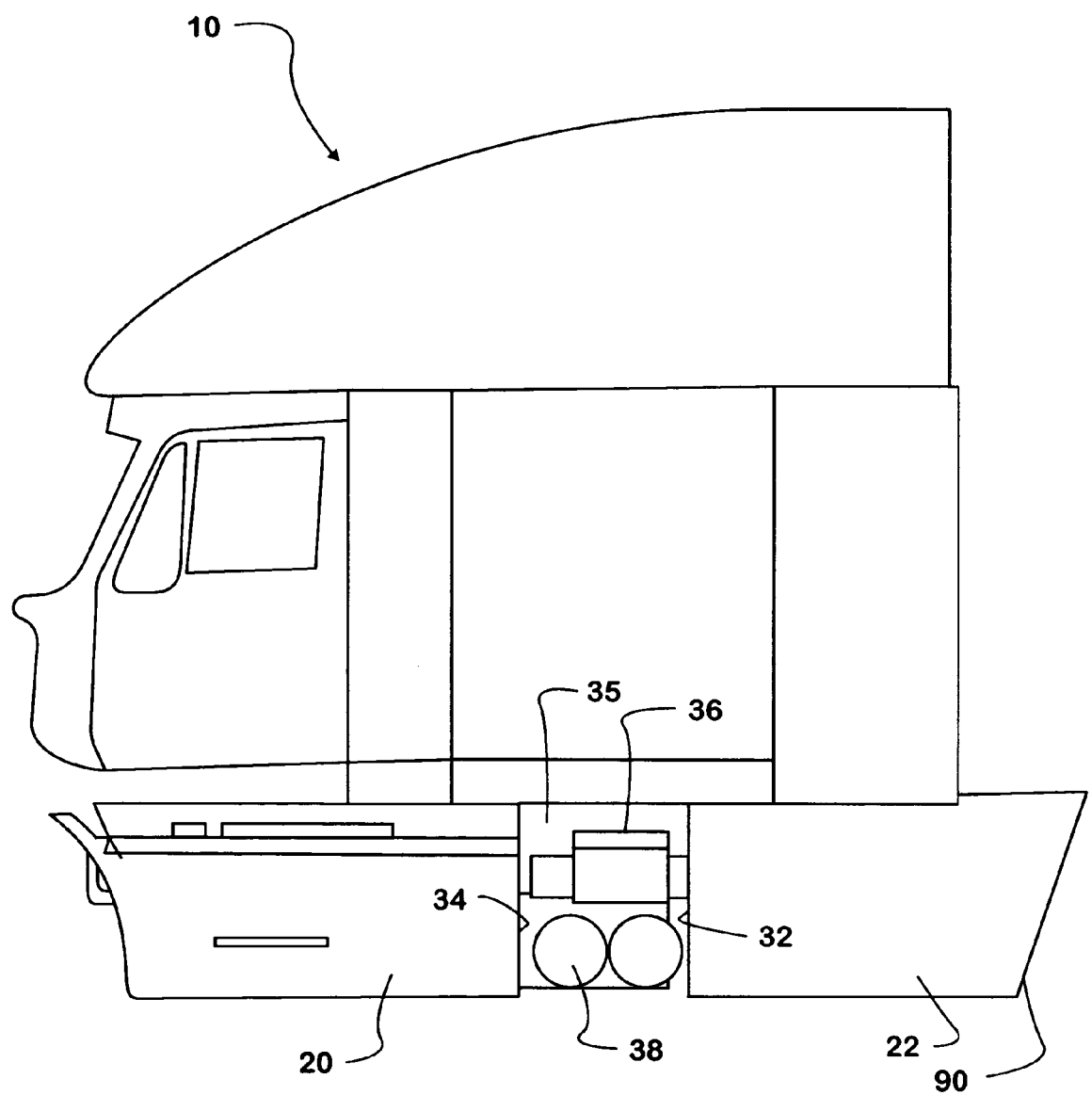
FIG. 4 is a side elevation of the driver side of the vehicle of FIG. 3 with the movable panel in its open position.

In FIG. 4, rearward, movable skirt panel 22 has been displaced rearwardly, with its rear edge 90 positioned behind the back end of truck body 10 and forward edge 32 of the movable skirt panel spaced from forward panel 20 sufficiently to allow access to components supported on a frame rail 35 of the vehicle chassis. Among the components accessible through the gap are a battery box 36 and compressed air cylinders 38. The gap between panel sections 20 and 22 when skirt panel 22 is rearwardly displaced, to the limit of its travel, should be about two feet. The length and limited displacement rearward of skirt panel 22 are chosen to avoid contact between the skirt panel and the vehicle's rear tires.

Figure 5:
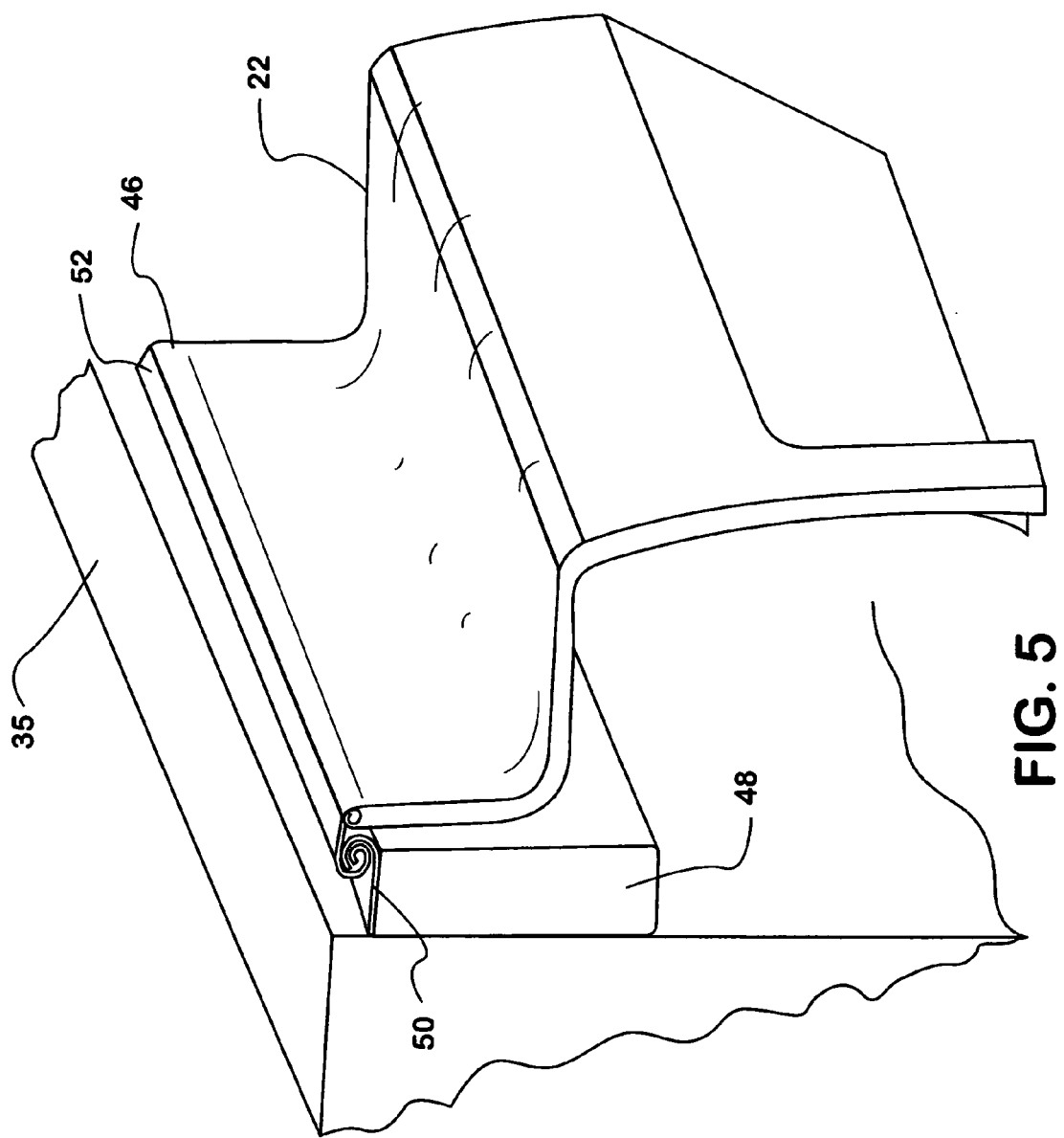
FIG. 5 is a perspective view of a section of a chassis including a possible support system for a track for carrying a movable skirt.
Figure 6:
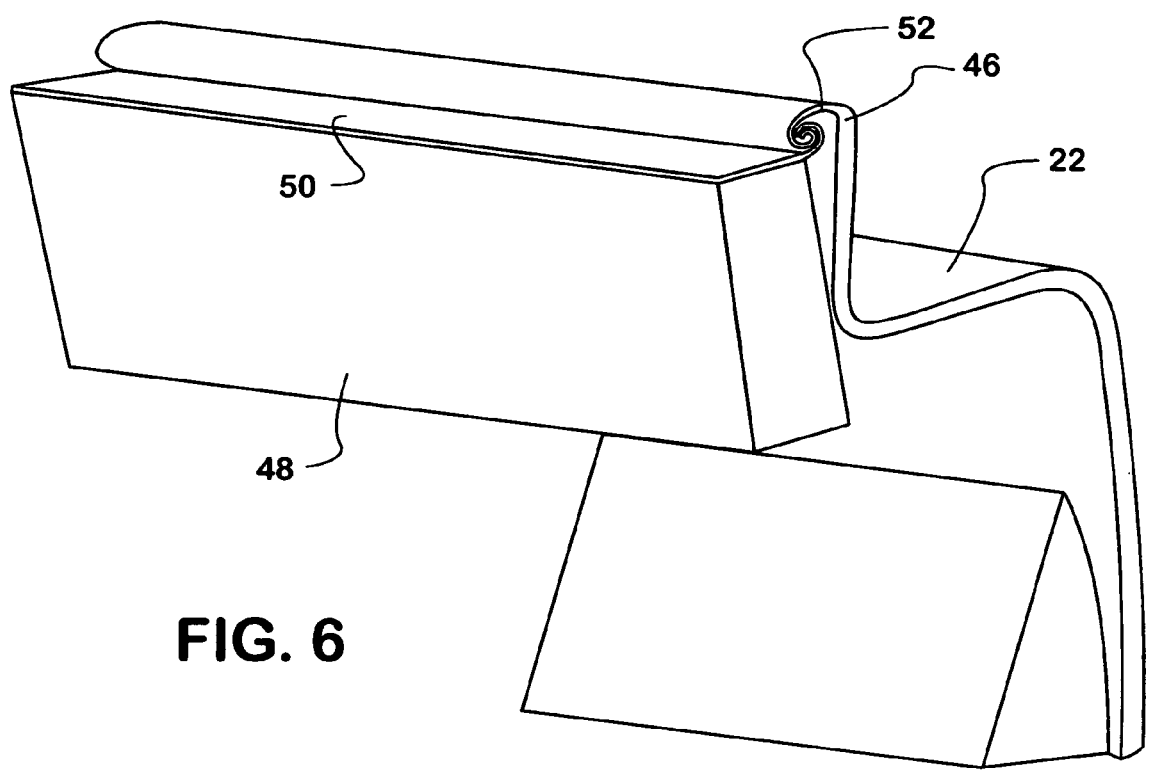
FIG. 6 is a perspective view of the support system of FIG. 5 from a different angle.
Figure 7:
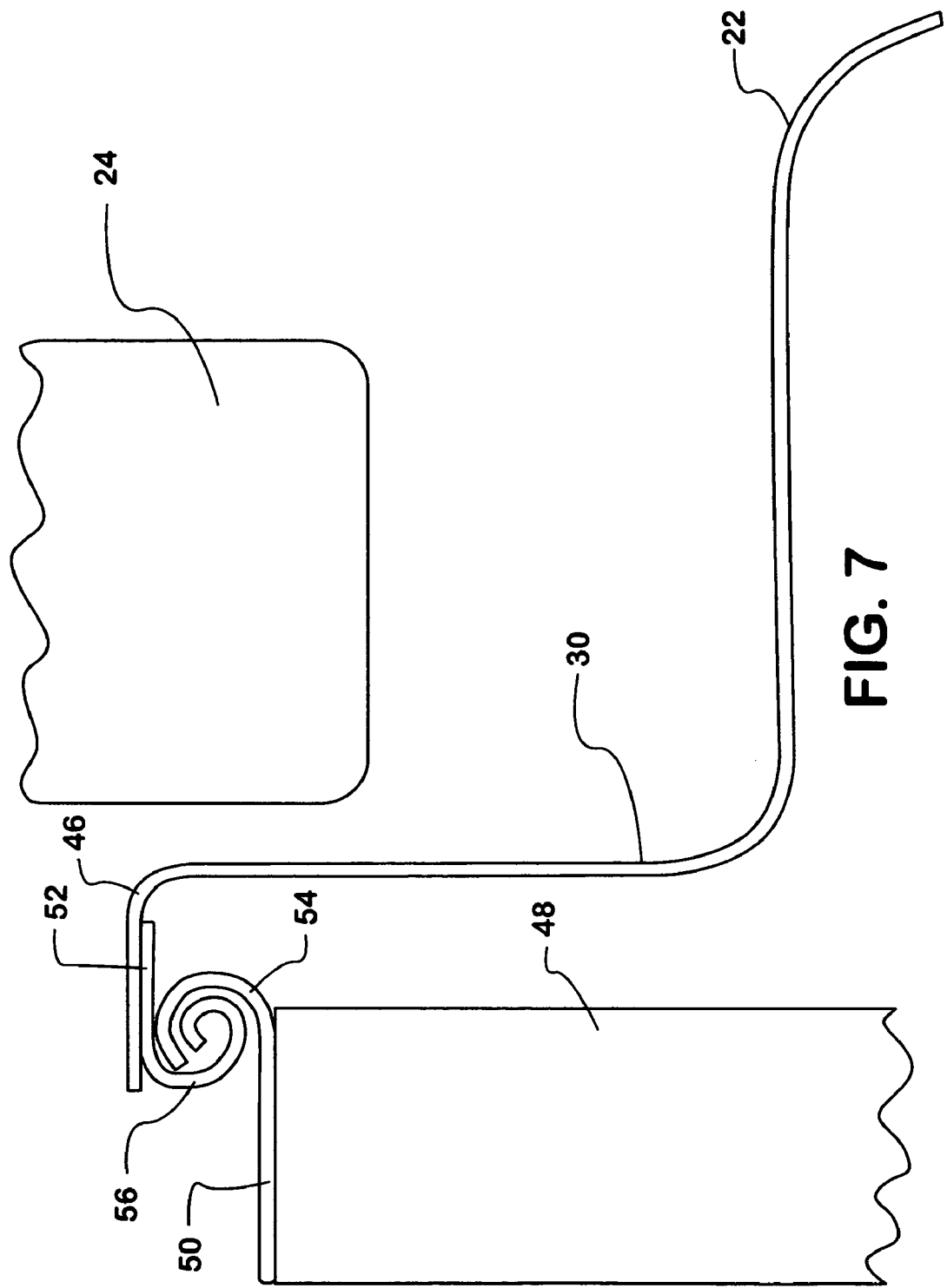
FIG. 7 is a cross sectional of the support system of FIGS. 5 and 6.

A first embodiment of the invention is illustrated in FIGS. 5–7. Movable skirt panel 22 can be supported from behind its upper edge 46 from the upper surface of a beam 48. Beam 48 is attached to the outside surface of frame rail 35 of a motor vehicle chassis to provide a skirt panel support frame. Interjacent tracks 50 and 52 provide both a connection between beam 48 and movable skirt panel 22 and a path along which the movable skirt panel can move relative to the beam 48. Track 50 is an extruded strip having a J-shaped cross section mounted along one side thereof to the upper surface of beam 48 so that the elongated hooked side of the strip is oriented away from frame rail 35 and upwardly from beam 48. Track 52 is also an extruded strip, supported and attached to the top edge 46 of movable skirt panel 22. Track 52 has an elongated, coiled edge disposed away from skirt pan I 22 toward frame rail 35 and turned downwardly to be fitted into and retained against lateral displacement by the pocket formed by the hook edge of track 50. Track 52 can slide axially along track 50 allowing movable skirt panel 22 to be moved back and forth parallel to frame rail 35.

FIG. 7 best illustrates the fitting of interjacent tracks 50 and 52 to one another. Upper edge 46 of movable skirt panel 22 forms a flatted ledge with upper and lower surfaces. Track 52 is attached along a face to the lower surface of upper edge 46. Track 52 turns downwardly away from the main body of movable skirt panel 22 with its coiled edge forming a bead end 56 which fits within the bowl 54 of J-hook cross sectionally shaped track 50 and functions as a slider bearing with track 50. The gap between bead end 56 and bowl 54 is exaggerated for clarity. The fit should be fairly snug to exclude the infiltration of debris which could cause the tracks to become jammed against one another making movement of skirt panel 22 difficult, but not so tight as to prevent the adjacent surfaces of the interjacent tracks from moving along one another. Tracks 50 and 52 may be extruded from plastics with sufficient plasticizer to give the tracks slippery surfaces. It may be seen that the junction between tracks 50 and 52 are behind and above the bottom of modesty panel 24 of truck body 10.

Figure 8:
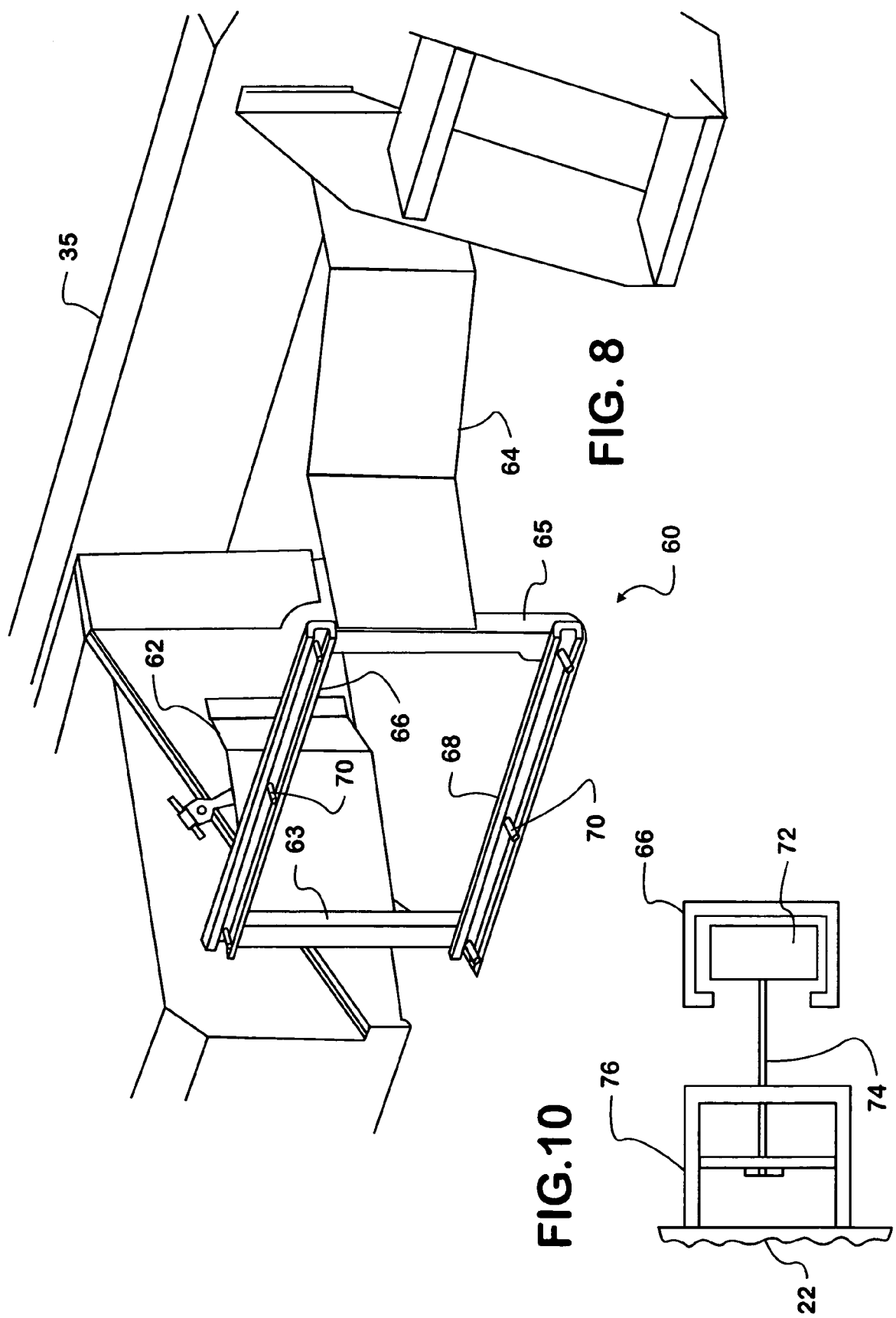
FIG. 8 is a perspective view of a dual support track for a second embodiment of the invention.
Figure 9:
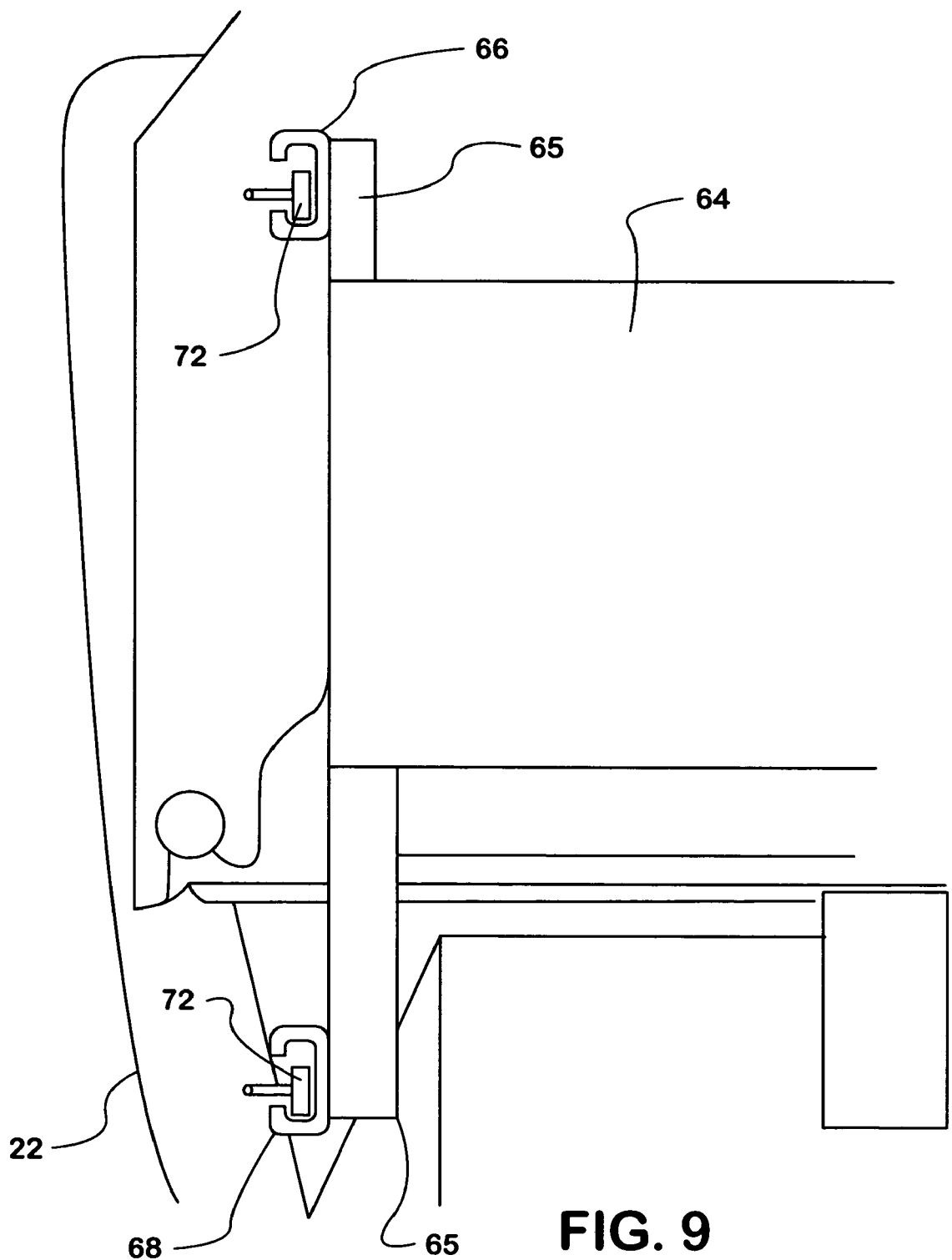
FIG. 9 is a cross sectional view of movable skirt panel and its support system of FIG. 8.

FIGS. 8–10 illustrate a dual track system 60, which provides an alternative mounting method for movable skirt panel 22. Dual track system 60 comprises two support arms 62 and 64 which may be directly or indirectly supported from frame rail 35 and which extend outwardly from the outer face of the frame rail toward a side of the vehicle. Arms 62 and 64 are bent inwardly on one another away from frame rail 35 and leave a gap into which a battery box may be fitted. At the ends of each of arms 62 and 64 distal to frame rail 35 an upright bar is mounted. These include a bar 63 depending from arm 62 and a bar 65 depending from arm 64. Upper and lower tracks 66 and 68 are attached between bars 63 and 65, parallel to frame rail 35 and mutually spaced from one another and provide a skirt panel support frame.

Tracks 66 and 68 are C channels into which rollers 72 may be fitted for rolling movement. The travel of rollers 72 back and forth in th channels is limited by fasteners 70 (nut and bolt combinations) positioned along the tracks and intruding into the interiors of the channels. Rollers 72 are positioned one per gap between fasteners 70 along tracks 66 and 68, with typically two rollers being installed in each track. The gaps have lengths of about 24 inches with fasteners 70 providing stops limiting the movement of rollers 72 in the gaps and the movement of movable skirt panel 22.

Each roller 72 is mounted at one end of an axle 74, the stem of which passes through the gap of the C-channels and the opposite end of which is mounted for rotation in a bracket 76. A plurality of brackets 76 may be provided affixed the inward face of skirt panel 22 to position rollers 72 in tracks 66 and 68 to support panel 22 from the tracks.

The invention provides a movable skirt panel for a truck chassis skirt which allows access to vehicle components without resort to tools and with reduced risk of damage to the skirt compared to systems requiring removal of the skirt.

While the invention is shown in only one of its forms, it is not thus limited but is susceptible to various changes and modifications without departing from the spirit and scope of the invention.

What is claimed is:

1. A skirt for a motor vehicle chassis having frame rails supported from front and rear wheels, the skirt further comprising:
    a skirt panel having an inside surface and an aerodynamic outside surface;
    a skirt panel mounting frame mounted outwardly with respect to a frame rail of the motor vehicle chassis with the skirt panel being supported by the skirt panel mounting frame to an outward side and spaced at least partially outwardly away from the frame rail to allow enclosure of vehicle components hung from the frame rail;
    a track supported on the skirt panel mounting frame; and
    bearing means depending from the skirt panel and set in the track to support sliding motion of the panel skirt back and forth parallel to the side of the motor vehicle chassis between the front and rear wheels to expose a section of the motor vehicle chassis and to orient the aerodynamic outside surface of the panel skirt away from the motor vehicle chassis.

2. A skirt for a motor vehicle chassis as set forth in claim 1, further comprising:
    a fixed position panel depending from the motor vehicle chassis forward from the skirt panel, the skirt panel being movable between a forward position directly adjacent to and just behind the fixed position panel along a first vertical edge, and a rearward position spaced from the fixed position panel allowing access to a portion of the motor vehicle chassis between the fixed position panel and the skirt panel.

3. A skirt for a motor vehicle chassis as set forth in claim 2, wherein the skirt panel is a molded plastic panel.

4. A skirt for a motor vehicle chassis as set forth in claim 3, further comprising:
    a set of rollers mounted for rotation with respect to the skirt panel and set in the track for linear movement.

5. A skirt for a motor vehicle chassis as set forth in claim 3, further comprising:
    the skirt panel having an upper edge adapted to cooperate with the track for supporting and positioning the skirt panel.

6. A truck body mounted on left and right sides frame rails, the truck body comprising:
    lower body panels mounted outwardly with respect to the right and left sides frame rails to cover portions of the frame rails; and
    the lower body panels including for at least one side frame rail a front section panel and an aft section panel, the aft section panel being moveable forward and back along the side frame rail between a forward position directly aft of the front section panel which allows space for a battery box between the aft section panel and the corresponding frame rail and a rearward position spaced from the front section panel to expose a portion of the side frame rail which carries a battery box.

7. A truck body as set forth in claim 6, wherein the aft section panel covers, when disposed in its forward position, the battery box depending from the vehicle chassis and further wherein the battery box is accessible between the rear section panel and the forward panel section when the aft section panel is in its rearward position.

8. A truck body as set forth in claim 7, further comprising a track depending from and parallel to the direction of elongation of the chassis supporting the aft section panel.

9. A truck body as set forth in claim 8, wherein the aft panel section further comprises:
a plurality of wheels mounted for rotation with respect to the aft panel section and set in the track allowing the aft panel section to moved linearly forward and backwards.

10. A truck body as set forth in claim 8, wherein the aft panel section further comprises:
an upper edge shaped to fit in the track for support and linear backwards and forward movement.

* * * * *